United States Patent [19]

Matsukawa et al.

[11] 3,855,196

[45] Dec. 17, 1974

[54] BIOLOGICALLY ACTIVE PEPTIDE AND METHOD OF PREPARING THE SAME

[76] Inventors: Hidehiko Matsukawa, c/o Tsukasa Sasaki, No. 139 Suwamachi, Shinjuku-ku; Haruo Ito, Kumegawa Jutaka Kodan, No. 1-4 Misumicho, Higashimurayama-shi; Taneko Suzuki, 18-13, 7-chome, Nishi-Shinjuku, Shinjuku-ku, all of Tokyo, Japan

[22] Filed: Sept. 10, 1973

[21] Appl. No.: 395,881

Related U.S. Application Data

[62] Division of Ser. No. 240,485, April 3, 1972, Pat. No. 3,794,561.

[30] Foreign Application Priority Data

| Sept. 30, 1971 | Japan | 46-76596 |
| Sept. 30, 1971 | Japan | 46-76597 |
| Sept. 30, 1971 | Japan | 46-76598 |
| Sept. 30, 1971 | Japan | 46-76599 |
| Sept. 30, 1971 | Japan | 46-76600 |

[52] U.S. Cl. .............................. 260/112 R, 195/29
[51] Int. Cl. ............................................. C07g 7/00

[58] Field of Search .................... 195/29; 260/112 R; 424/177

[56] References Cited

UNITED STATES PATENTS

| 3,498,964 | 3/1970 | Hayashi | 195/29 X |
| 3,794,561 | 2/1974 | Matsukawa et al. | 195/29 |

*Primary Examiner*—Samih N. Zaharna
*Assistant Examiner*—Robert J. Warden
*Attorney, Agent, or Firm*—Sughrue, Rothwell, Mion, Zinn & Macpeak

[57] ABSTRACT

The novel biologically active peptide valuable as an adjuvant for various medicaments and cosmetics as well as an additive for medicated wines and other edible products is prepared from the skeletal muscles of visceral muscles of the animals of the family Cervoidae such as *Rangifer tarandus* by decomposing the raw materials into low molecular weight peptides with a protease and collecting the active water-soluble portions therefrom by means of a molecular sieve or an ion-exchange resin.

1 Claim, 2 Drawing Figures

BIOLOGICALLY ACTIVE PEPTIDE AND METHOD OF PREPARING THE SAME

This is a U.S. Division of application Ser. No. 240,485, filed Apr. 3, 1972 now U.S. Pat. No. 3,794,561.

DETAILED DESCRIPTION

Figure 1:
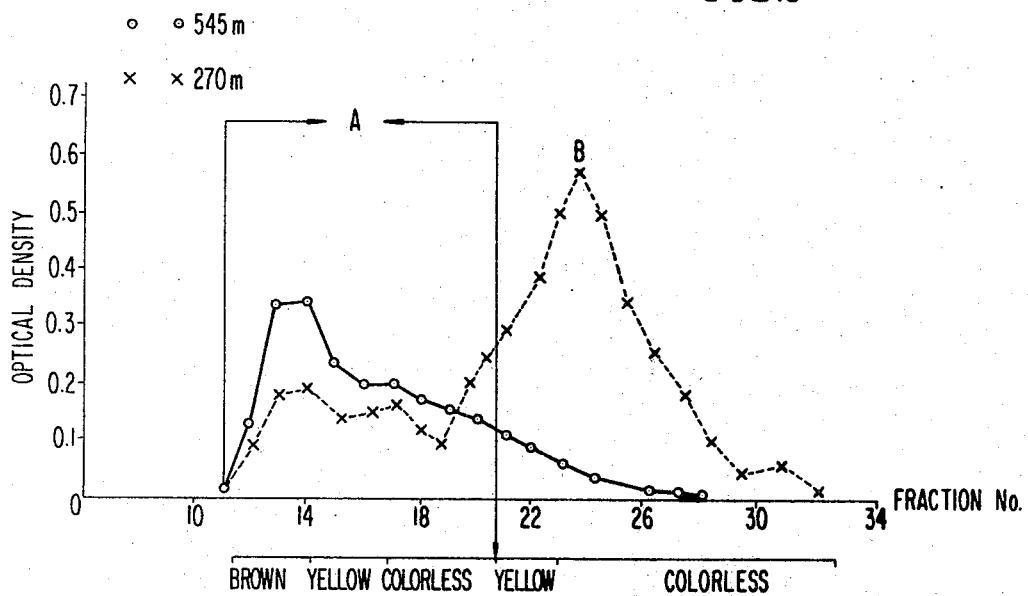
FIG. 1 shows the biologically active fraction A, obtained by the gel filtration, whereby the crude peptide is refined, and the inactive fraction B.

The present invention relates to a novel peptide having various biological activities obtained from the skeletal muscles and/or visceral muscles of the animals of the family Cervoidae. The invention further relates to a method of preparing such a novel peptide and also to various compositions containing the novel biologically active peptide.

The peptide of this invention is readily absorbed by the skins of mammals to act to increase the blood flow in the tissues and also to restrain the action of Myosin ATPase and thus can be utilized for various purposes as will be indicated below.

The novel and valuable peptide of this invention is generally prepared by decomposing the skeletal muscles and/or visceral muscles of the animal of the family Cervoidae with a protease into low molecular weight peptides, collecting the parts of the peptides soluble in a water-containing hydrophilic solvents, and then collecting active peptides therefrom by means of a molecular sieve or an ion-exchange resin.

The raw materials used in this invention may be recovered from any animals of the family Cervoidae but is preferably recovered from *Rangifer tarandus* (reindeer, caribou), *Cervus nippon*, *Cervus elaphus*, or *Alces alces*. Furthermore, the peptides of this invention is obtained from only the skeletal muscles or the visceral muscles of the aforesaid animals but is not obtained from other parts of the animals.

Bradykinin, Wasp-kinin, Substance-P, etc., have hitherto been known as low molecular weight peptides having biological activities obtained from animals and the biologically activities of these known peptides can be typified by the activities of the Bradikinin. Also, such known biologically active peptides are always present in the living bodies as the form of free peptides formed by metabolism.

The novel peptides of the present invention may be distinguished from those known peptides in the following points:

1. The peptide of this invention has a function of being readily absorbed from the skins of mammals to increase remarkable the blood flow in the tissues but the known peptides have no such a function.

2. The peptide of this invention can restrain the action of Adenosine triphosphtase (hereinafter, it is abbreviated "ATPase" in the specification) of Myosin A or Myosin B but the known peptides have no such a function.

3. The peptide of this invention can also restrain the formation of the superprecipitation caused by the addition of Adenosine triphosphate (hereinafter, the phosphate is abbreviated "ATP") to Myosin B, that is, the peptide of this invention shows the muscle relaxation in vitro but the known peptides have no such a function.

Moreover, the inventor of the present invention and other parties have succeeded previously in obtaining the peripheral vasodilator peptide from the skeletal muscles and/or viscera of the animals of the family Otariidae but the peptide of the present invention is also different from the peripheral vasodilator peptide in the following points:

4. The known peripheral vasodilator peptide obtained from the skeletal muscles or viscera of the animals of the family Otariidae has a function of increasing the evoked potential in the cerebral cortex but the peptide of the present invention has no such a function.

5. The known peripheral vasodilator peptide obtained from the skeletal muscles or viscera of the animals of the family Otariidae causes, when injected intravenously, the dilation of the blood vessels of the cerebral cortex but the peptide of the present invention has no such a function.

The structure and the amino acid composition of the peptide of the present invention have not yet been clarified but the molecular weight thereof is assumed to be considerably low. Also, the peptide of this invention has not yet been purified into a single component but the peptide has been confirmed to show the following properties:

SOLUBILITY

Soluble in water as well as in aqueous ethanol containing less than 65% ethanol, sparingly soluble in aqueous ethanol containing 65–80% ethanol, and insoluble in aqueous ethanol containing more than 80% ethanol, each at room temperature.

CHEMICAL COLOR TEST

The biuret reaction, ninhydrin reaction and Pauly's reaction in regard to the 0.1% peptide solution are positive, while the Ehrlich's reaction and the Sakaguchi's reaction are negative. The absorption maximum of the peptide solution in the biuret reaction is observed in the wave length region of 525–530 m.$\mu$., which is positioned at a slightly shorter wave length side than the region of 545–550 m.$\mu$., the absorption maximum of color resulting from the biuret reaction about protein.

ULTRAVIOLET ABSORPTION SPECTRUM

The absorption maximum is observed near 275 m.$\mu$. and near 285 m.$\mu$. The ratio of the optical density of 0.1% aqueous solution of the peptide of this invention at 275 m.$\mu$. to the optical density in the biuret reaction at 545 m.$\mu$., $E_{275/545}$ is in the range of 2.0–3.0.

VISCOSITY

The viscosity of 18% solution of the peptide of this invention at 20°C. is 7.0–7.5 cps. (by means of a Brockfield Viscometer).

ESTIMATION OF THE MOLECULAR WEIGHT

When a pouch of a cellophane film was filled with aqueous peptide solution and the dialysis of the solution to water was tested, the peptide of the invention was passed through the film. Also, the molecular weight of the peptide of this invention was estimated by a molecular sieve method by cross-linked dextrane, it was estimated to be less than 1000 although it was difficult to know the accurate molecular weight caused by the occurence of absorption.

The aqueous solution of the peptide of this invention shows the following biochemical properties:

1. The skeletal muscles of a rabbit or a fish were extracted for 24 hours with a potassium chloride solution having an ionic strength of 0.6, the ionic strength of the extract was adjusted to 0.25, and then the Myosin B thus precipitated was recovered from the extract. When 100 $\mu$. to 2 mg. of the peptide of this invention was added to the Myosin B solution in the presence of ATP of a concentration of $10^{-3}$ mol at an ionic strength of 0.03, the reaction was conducted for 1–5 minutes at 25°C., and the action of ATPase was measured from the inorganic phosphorus thus liberated, it was observed that the peptide of this invention restrained slightly the action of ATPase.

2. When ATP was added to the suspension (having an ionic strength of 0.02) of the Myosin B prepared as the manner mentioned above so that the concentration of ATP became $10^{-3}$ mol, the super-precipitation occurred to cause the contraction of the Myosin B. On the other hand, when 100 $\mu$. to 2 mg. of the peptide of this invention was preliminary incorporated in the suspension of the Myosin B, the occurence of the super-precipitation by ATP could be effectively restrained. The superprecipitation has been recognized as the model of the muscle contraction by the energy released by the Myosin-ATPase action and also the restraint of the superprecipitation, caused by the restraint of the Myosin-ATPase, is called as the model of the muscle relaxation. Thus, it is believed that the peptide of this invention causes the relaxation of muscles.

The actions of the peptide of this invention when administered from skin or in blood vessels are as follows:

1. An ointment containing 0.05% the peptide of this invention was applied to a shaved abdominal portion of a narcotized rabbit and the variation of the blood flow in the tissues with the passage of time was measured by means of a Shincorder CTE-201 type flow meter. By the experiment it was observed that the amount of the blood flow increased to about 15% after 30 minutes and to 25% after 60–120 minutes, and further the variation became plateau after 3 hours. On the other hand, when the same procedure as above was followed using, as a control sample, an ointment without containing the peptide of this invention, the variation of the blood flow was not observed. Furthermore, when the same procedure as above was repeated using an ointment containing Bradykinin alone or a mixture of Bradykinin and the peptide of this invention, the increase of the blood flow was not also observed.

2. When an ointment containing 0.1% the peptide of this invention was applied to the skin of a rabbit, a $^{131}$I-alubmin solution was administered by subcutaneous injection to the rabbit, and then the presence of the labeled $^{131}$I in the blood was measured, the retention period of time of the $^{131}$I in the blood was longer than that in the case of administering the solution by subcutaneous injection without the application of the ointment and also the speed of transfer of the solution in the blood was faster than the latter case. That is, the peptide of this invention has such functions of increasing the speed of the penetration into the blood a material present therewith and prolong the retention period of the material in the blood.

3. When an electromagnetic flow meter was inserted in the one femoral artery of a dog narcotized by Nembutal (pentobarbital sodium) having a weight of about 10 kg. and 500 $\mu$.g. of the peptide of this invention was administered to the dog by means of a device capable of recording the amount of blood flow and also the blood pressure by utilizing a Y-shaped tube, about 50% of the increase of the amount of the blood flow and the slight reduction (less than 5%) of the blood pressure were observed. The increase of blood flow and the reduction of blood pressure are not blocked by atropine, $\beta$-blockade, and an antihistamic agent. By comparing the properties of the peptide of this invention with those of Bradykinin showing similar properties, it has been confirmed that the increased amount of the blood flow by the administration of 500 $\mu$g. of the peptide of this invention can be obtained by using 0.01 $\mu$g. of Bradykinin, in other words, the increased amount of the blood flow by the peptide of this invention is 1/50,000 of that by Bradykinin.

Then, other peptides obtained from other animals than those of the family Cervoidae by the same manner as mentioned above were tested whether they had the similar properties as above or not, the results of which are as follows.

When the peptides prepared from the skeletal muscles of a dog, a cat, an ox, a pig, a hen, a dolphin, a whale, an Alaska pollack, and a horse mackerel; from the muscles of the body of a sagittated calamary; and from the ligament of a bivalve were tested, no increase of the tissue blood flow was observed in each case when an ointment containing each of the peptides was applied to the skin of a rabbit but the amount of the tissue blood flow decreased on the contrary. Furthermore, these peptides did not accelerate the penetration of a material such as $^{131}$I-albumine present therewith into the blood vessel. The functions of the peptides for increasing the amount of the blood flow of the fermoral artery of a dog and reducing the blood pressure were observed to be one-half to one-fifth of those obtained by using the peptide of this invention obtained by the animals of the family Cervoidae or no such functions were observed in regard to such peptides. Moreover, many of those peptides were not effective to the Myosin-ATPase action and only the peptides obtained from a horse mackerel, a dolphin, and a whale accelerated the action of the Myosin-ATPase to some extent.

On the other hand, when the peptides obtained from the skeletal muscles or viscera muscles of the animals of the family Otariidae was applied to the skin of a rabbit, the increase in the tissue blood flow was observed. Also, when 500 $\mu$g. of the peptide obtained from the animals of the family Otariidae was administered to a dog, more than 50% of the amount of the blood flow of the dog increased but at the same time the reduction in the blood pressure was observed to be more than 20%. Thus, the peptide of this invention showing a very weak blood-pressure reducing action as mentioned above can be clearly distinguished from the known peptide. Moreover, the known peptide contributes, on the contrary, to accelerate the action of the Myosin-ATPase and has an action of activating the super-precipitation caused by Myosin B and ATP.

When the peptide of the present invention was administered from skin or orally, the following results were obtained.

When the cream containing 0.03% of the peptide of this invention was applied to 127 persons continuously for one month, it was reported by 108 persons that their skins became smoother. Also, when the peptide of the invention was administered orally to 48 persons for 2 weeks as a drink containing 10 mg. of the peptide per administration, it was reported by 42 persons that their muscles were recovered from fatigue and at the same time their skins became smoother.

The peptide of this invention is prepared by the following three steps.

In the first step the skeletal muscles and/or visceral muscles of the animals of the family Cervoidae are first digested by a protease. That is, after removing fat layer, the muscle is washed with water to remove bloods, etc., minced, and then, if necessary, treated with acetone or hexane to remove fats therefrom. The minced or defatted muscle is mixed with a proper amount of water to provide an aqueous slurry and then a protease is added to the aqueous slurry followed by digestion. As the protease, 160–500 units (P.U.K.) of such commercially available protease as "Bioplase" (Nagase Co., Japan) and "Prozyme" (Amano Seiyaku Co., Japan) is added per 1 gram of the muscle and the digestion is conducted for 1–4 hours at 40°–50°C. After the digestion is over, the product liquid obtained by the decomposition of the muscle is heated for 15 minutes to 90°C. to inactivate the enzyme and to coagulate the undecomposed high molecular weight polypeptide at the same time. Then, the solid matters in the digestion product liquid are removed by filtration or centrifugal separation and then the filtrate or the supernatant liquid is collected.

In the second step, the filtrate or the supernatent liquid obtained above is first concentrated to ¼–1/5 of the volume of the original liquid and then ethanol is added to the concentrate so that the content of ethanol became 40–70%. The mixture is preferably allowed to stand overnight in a refrigerator to ripen sufficiently the precipitates formed by the addition of ethanol and then the precipitates were removed from the system by means of a filtration or a centrifugal separator. The alcohol in the solution is, then, distilled away and the aqueous phase remained is recovered and further purified in the third step as will be stated below, or subjected to a freeze-drying, spray drying, or a drying under a low pressure and low temperature to provide a faint yellow powder. The product powder may be stored as a crude powder containing the effective component and be purified as occasion demands.

In the third step, the crude product, i.e., the aqueous solution or the crude powder, recovered in the above step is purified in the following two ways alternatively.

1. The concentrated aqueous solution recovered in the above-mentioned alcohol-removal step or an aqueous solution prepared by dissolving the crude powder obtained in the above step in a proper amount of water is treated by a molecular sieve using a proper gel to recover the biologically active portion therefrom.

At the practice of the purification method, the upper portion of a column packed with, e.g., a cross-linked dextran gel (commercially available as "Sephadox" G-25 fine or medium, product of Pharmacia Co.) is filled with the above-mentioned aqueous solution and then distilled water is flowed down through the column to elute the products. After the volume of the liquid corresponding to the volumn of the column has been eluted, a fraction colored in yellow-brown is obtained followed by a fraction of liquid colored in faint yellow, and then a colorless fraction continues. Each of the fractions thus recovered is diluted with a proper amount of water and after adding a biuret reagent, the optical density of the effluent at 545 m.μ. is measured. Also, the ultraviolet absorption of it at 270 m.μ. is measured. When the amount of each fraction is plotted to the optical density of the fraction, it is understood that the peak showing strongly the biuret reaction appears in the fraction coming in an earlier period and then a fraction showing strongly the optical density at 270 m.μ. follows after although some portions of the fractions may be duplicated. The biologically active peptide of this invention is present in the fraction showing strongly the biuret reaction. The pattern of the fractions is shown in FIG. 1 of the accompanying drawing, wherein the biologically active peptide is present in the fraction A of the figure but is not present in the fraction B. When the active fractions are collected and subjected to a spray drying, a freeze drying, or a vacuum drying, the faint yellow powder of the biologically active peptide of this invention is obtained.

2. The concentrated aqueous solution recovered from the above-mentioned alcohol-recovery step or an aqueous solution prepared by dissolving the crude powder obtained in the second step is passed through a column packed with a cation-exchange resin. Then, the solution is developed while increasing the pH thereof to 7 from 4 and then the fractions showing strongly the biuret reaction flowing out in a pH range of 6 and 7 are collected. As the cation-exchange resin, acid-type or base-type Dowex-50W-X2 and Dower-50W-X8 may be employed. By subjecting the effective fractions thus collected to a spray drying, a freeze-drying, or a vacuum drying, the faint yellow powder of the biologically active peptide of this invention is obtained.

In each of the purification methods (1) and (2), the yield for the biologically active peptide is 1–0.8% by weight based on the weight of the raw material, i.e., the skeletal or visceral muscle.

EXAMPLE 1

After removing fat layer from the skeletal muscles of Rangifer tarandus, 10 kg of the skeletal muscles thus treated was minced, mixed with 35 liters of acetone, and after being allowed to stand overnight, the mixture was squeezed by a cloth-made bag. Then, 30 liters of acetone was added to the meat thus obtained and after stirring the mixture for 30 minutes, the mixture was squeezed again by a cloth-made bag. This operation was repeated thrice and the dressed and dehydrated meat was dried by hot blast at 60°C. to remove the acetone, whereby 2.5 kg. of the dried meat was obtained. After adding to the meat 10 liters of distilled water followed by swelling well the meat, 120 g. of 20,000 unit Bioplase SP-4 (Nagase Co., Japan) was added to the mixture and the digestion was conducted for 3 hours at 45°C. ± 1°C. Then, by heating the digestion product liquid to 90°C. for 15 minutes, the action of the enzyme was stopped. The decomposition product liquid was separated by means of a basket type centrifugal separator having a diameter of 40 cm. to provide 8 liters of the faint brown decomposition product liquid. The liquid was concentrated under a pressure of 40–50 mm. Hg at a bath temperature of lower than 80°C. and at a liquid temperature of lower than 40°C. to provide 2.0 liters of the concentrated liquid. The liquid was then mixed with 3 liters of ethanol and the mixture was allowed to stand overnight at 2°–3°C. Then, the precipitates thus formed were filtered away and the filtrate was subjected to a freeze drying to provide 320 g. of a crude powder of peptides.

EXAMPLE 2

In 900 ml. of water was dissolved 300 g. of the dried crude powder obtained in Example 1 and the aqueous solution thus obtained was used as the starting material of this example of the water-containing alcohol solution of the product obtained in Example 1 was concentrated into about one liter and the concentrate was used as the starting material.

Sephadex G-25 (fine) was sufficiently swollen and packed in a column having a diameter of 21.5 cm. and a height of 100 cm. The above-prepared liquid was passed through the column and then the product was eluted by distilled water at a flow rate of 1.2 liters/hour. The fractions of biuret reaction positive and having biological activity were collected according to the predetermined pattern of fraction and concentrated under pressure of 40–50 mm. Hg at a temperature of lower than 40°C. to provide 350 ml. of the concentrate. When the concentrate was subjected to a freeze drying at a temperature of −20°C., a white flaky dry powder was obtained. The yield for the purified product was 80 g. per 10 kg. of the raw material.

Figure 2:
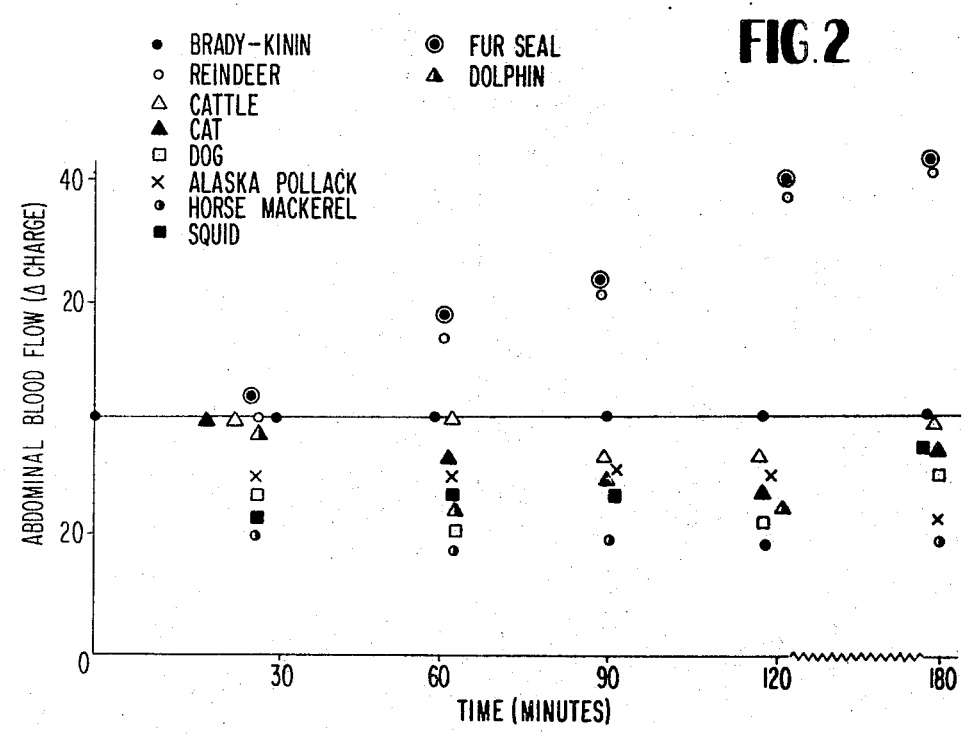
FIG. 2 shows the influences of various peptides extracted in the same way from the muscles of various animals on the blood flow.

An ointment containing no peptide of this invention was applied to one side of the shaved abdomen of a rabbit and an ointment containing 10 mg. of the peptide obtained above per 100 g. of the ointment was applied to the other side of the shaved abdomen of the rabbit. In the tissues under the skin of each portion was inserted a needle-type transducer, which was then connected to a flow meter, and the variation of the tissue blood flows were measured. Because it was impossible to show clearly the absolute variation of the tissue blood flow by a Sincorder CTE 201 type flow meter used in this experiment, the scale thereof was set to zero at start, the increase of the tissue blood flow was designated by plus (+) and the decrease of the tissue blood flow was designated by minus (−), and the extent of each variation was shown relatively by percentage. The influences of various peptides extracted from the muscles of various animals on the blood flow were examined by the same way and the results are shown in FIG. 2. As clear from the results, the tissue blood flow was scarcely varied when ointments containing other peptides than that of this invention were applied, while the tissue blood flow increased in the case of applying the ointment containing the peptide of this invention obtained above.

Furthermore, 10 mg. of the peptide prepared above was dissolved in 10 ml. of distilled water and the influence of it to the Myosin-ATPase action was tested. In a blender, 10 g. of the meat of a carp was extracted with 40 ml. of cold 0.6 mol KCl solution for 3 minutes and after adding further 60 ml. of cold 0.6 mol KCl solution to the system, the mixture was allowed to stand. Then, the mixture was subjected to a centrifugal separation for 30 minutes at 7000 rpm, the supernatant liquid thus formed was diluted with water to thrice the original volume, and the precipitates thus formed were recovered by subjecting the system to a centrifugal separation for 20 minutes at 7000 rpm. to provide Myosin B. In the enzyme reaction system was incorporated Myosin B, i.e., ATPase in an amount of 0.015 mg. As nitrogen per one ml. thereof and the ionic strength of the reaction system was adjusted to 0.03. To the reaction system was added 1 ml. of the solution of the sample mentioned above (1 mg. as the peptide) followed by mixing well and then ATP was added to the mixture in a vessel maintained at a constant temperature of 25°C. so that the concentration thereof in the reaction system became 0.72 m. mol. Thereafter, the reaction product liquid was sampled every 1 minute up to 1–5 minutes and then the reaction was stopped by adding trichloroacetic acid solution. Then, the amount of the inorganic phosphorus liberated was measured by an Allen's method about each sampled liquid. The same procedure as above was followed without adding the peptide of this invention as a control example and the amount of phosphorus released was compared with the result obtained above, the results of which are shown in the following table.

| minute | 0 | 1 | $\mu$ mol Pi/mg.-N 2 | 3 | 4 | 5 |
|---|---|---|---|---|---|---|
| Control | 2.2 | 3.0 | 3.6 | 4.0 | 5.0 | 5.8 |
| Sample of Invention | 2.2 | 2.5 | 3.0 | 3.2 | 3.8 | — |

From the above results, it will be clearly understood that the Myosin B ATPase activity was restrained by the peptide of this invention.

EXAMPLE 3

A mixture of 200 g. of the skeletal muscle of Cervus elaphus and 50 g. of the heart muscle thereof was washed well with water and minced. After adding thereto 500 ml. of water and 8 g. of 30,000 P.U.N. protease (Nagase Bioplase), the meat was digested for 2 hours at 45°C. Then, the system was heated to 90°C. for 10 minutes and after cooling, the reaction product was subjected to a centrifugal separation for 15 minutes at 5,000 rpm. to provide 650 ml. of the supernatant liquid. The supernatant liquid was concentrated under a reduced pressure to about 100 ml. and after adding thereto 150 ml. of ethanol, the mixture was allowed to stand overnight at 2°C. By filtering away the white precipitates thus formed, 250 ml. of a faint brown filtrate was obtained. The alcohol was distilled away from the filtrate and the residue was concentrated to about 90 ml. A column of 3.5 cm. in diameter and 74 cm. in height was packed with Sephadex G-25 (fine). The amount of one fraction of the above-described liquid was 30 ml. The product was eluted with distilled water at a rate of 100 ml./hr. and the fractions of biuret reaction positive and having biological activity were collected in accordance with the predetermined fraction pattern. The fractions were combined with those from the second and third runs and the mixture was subjected to a vacuum drying to provide 2 g. of the faint yellow powder of the biologically active peptide. The powder was mixed with dextrin so that 100 $\mu$g. of the peptide was contained in 1 g. of the blend.

EXAMPLE 4

An aqueous solution prepared by dissolving 300 g. of the dry powder obtained in Example 1 in 900 ml. of water or a water-containing alcohol solution of the peptide obtained in Example 1, which had further been concentrated to one liter, was used as the starting material. The solution of the starting solution applied to a column packed with an ion-exchange resin, Dowex-50W-X2 (registered trade name of Dowex Co.), definite amounts of acetate-sodium acetate buffer solutions having increasing pH of 4.0, 5.0, 6.0 and 7.0 were passed successively through the column, and then the fractions having a pH of 6.0–7.0 were collected. The fractions having a pH of lower than 6.0 showed strongly the ninhydrin reaction but showed very weak biuret reaction, while the fractions having acidic property of higher than 6.0 in pH showed strongly the biuret reaction. The above fractions thus collected were concentrated. If it is desired to remove the buffer solution contained in the fraction mixture, the mixture may be applied to a column containing Sephadex G-25 and then the product may be eluted with water.

EXAMPLE 5

A mixture of 2 g. of paraffin, 3.5 g. of cetanol, 4 g. of a hardened oil, 3 g. of purified lanoline, 2 g. of bleached bees wax, 0.1 g. of butyl p-oxybenzoate, 24 g. of squalan, 3.2 g. of glycerol monostearate, and 5 g. of hexadecyl adipate was melted at 70°C. to provide a mixed oil component. Then, in 480 ml. of water were dissolved 50 mg. of the peptide prepared in Example 2, 2.0 g. of polyethylene glycol, and 2.8 g. of polyoxyglycol sorbitan monolaurate to provide an aqueous component. The oil component prepared above was mixed with the aqueous component followed by stirring at about 30°C. to provide a cosmetic cream.

EXAMPLE 6

In 80 parts of ethanol were dissolved 19.7 parts of castor oil, 0.3 part of salicylic acid, and 0.1 part of the peptide powder obtained in Example 3 and after adding thereto further a dye and a perfume followed by stirring and filtering to provide a hair tonic.

EXAMPLE 7

In a uniform mixture of 30 parts of glycerol and 20 parts of water were dissolved 1 part of carboxymethyl cellulose (C.M.C.), 5 parts of sodium fumarate, a trace of soluble saccharin, and 1.5 parts of sodium lauryl sulfate and after adding thereto further 40 parts of calcium secondary phosphate, the mixture was kneaded well. Then, one part of peppermint oil, 0.1 part of the peptide powder obtained in Example 2, and 4 parts of liquid paraffin were added to the mixture and the resultant mixture was further kneaded well to provide a tooth paste.

EXAMPLE 8

Twenty kilograms of sugar, 5 g. of sorbitol, 250 g. of citric acid, 50 g. of di-malic acid, 5 g. of thiamine hydrochloride, 5 g. of riboflavin, 50 g. of ascorbic acid, 2 g. of pyridoxine hydrochloride, 15 g. of nicotinic acid amine, 3 g. of calcium panthothenate, 20 g. of L-lysine hydrochloride, 100 g. of a dry powder of a dispersion of the dry powder of the peptide obtained in Example 2 in dextrin of an amount of 10 times that of the peptide, 500 g. of purified honey, 50 ml. of a liqueur essence, and 40 ml. of a whisky essence were mixed and diluted with water to make the whole volume to 100 liters to provide a medical drink. At use, the drink was used as it was without being diluted.

EXAMPLE 9

A mixture of 0.05 part of aqueous solution of 10% the dry crude powder of the peptide obtained in Example 1, 40 parts of sugar, 25 parts of grape sugar, and one part of a lemon essence was kneaded with a chewing gum base, a mixture of 12 parts of a vinyl acetate resin, 7 parts of chicle gum, 2 parts of butyl phthalyl glycolate, 1 part of carnauba wax, and 2 parts of calcium carbonate by means of a mixing roll to provide a chewing gum.

EXAMPLE 10

A mixture of 50 parts of water and 17 parts of 90% alcohol was mixed with an aqueous solution prepared by dissolving 3.5 parts of grape sugar and 0.4 part of 40% millet-jelly in 15 parts of water and then to the mixture was added a solution prepared by dissolving 0.02 part of sodium glutamate, 0.09 part of succinic acid, 0.09 part of 75-lactic acid, 0.02 part of acid calcium phosphate, 0.02 part of sodium chloride, 0.02 part of alanine, and 0.02 part of glycine in 5 parts of water. Then, 5 parts of a perfume and 0.1 part of 10% aqueous solution of the peptide of this invention prepared in Example 2 followed by stirring well to provide a medicinal wine.

EXAMPLE 11

A vessel was filled with a mixture of one kg. of an unripe plum and one kg. of sugar. Then, after adding thereto a solution of 3 g. of 10% aqueous solution of the peptide of this invention prepared in Example 2 in 1.8 liters of 35% spirits, the vessel was closed and allowed to stand for few months in a cold and dark room to provide a medicinal plum brandy.

What is claimed is:

1. The biologically active peptide prepared by the method which comprises decomposing enzymatically the skeletal muscles or the visceral muscles of an animal of the family Cervoidae with a protease to provide low molecular weight peptide product, collecting the soluble portion of the product in a water-containing hydrophilic solvent, subjecting the solution of the product thus collected to a separation procedure using a gel-type molecular sieve or an ion-exchange resin, and collecting the effective fractions thus separated.

* * * * *